(12) United States Patent
Sastry

(10) Patent No.: US 12,206,598 B2
(45) Date of Patent: *Jan. 21, 2025

(54) COMPUTER BASED EDUCATION METHODS AND APPARATUS

(71) Applicant: Amesite Inc., Detroit, MI (US)

(72) Inventor: Ann Marie Sastry, Detroit, MI (US)

(73) Assignee: Amesite Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/428,710

(22) Filed: Jan. 31, 2024

(65) Prior Publication Data

US 2024/0171526 A1 May 23, 2024

Related U.S. Application Data

(63) Continuation of application No. 18/068,468, filed on Dec. 19, 2022, now Pat. No. 11,895,040, which is a continuation of application No. 16/268,282, filed on Feb. 5, 2019, now Pat. No. 11,533,272.

(60) Provisional application No. 62/627,143, filed on Feb. 6, 2018.

(51) Int. Cl.
  *H04L 47/80* (2022.01)
  *G06F 1/3203* (2019.01)
  *G06N 20/00* (2019.01)
  *H04L 67/01* (2022.01)
  *H04L 67/50* (2022.01)

(52) U.S. Cl.
  CPC .......... *H04L 47/805* (2013.01); *G06F 1/3203* (2013.01); *G06N 20/00* (2019.01); *H04L 67/01* (2022.05); *H04L 67/535* (2022.05)

(58) Field of Classification Search
  CPC ..... H04L 47/805; H04L 67/01; H04L 67/535; H04L 67/12; H04L 67/306; H04L 9/50; G06F 1/3203; G06F 1/3206; G06F 1/3234; G06N 20/00; G06N 3/04; G06N 3/08; G09B 5/065; G09B 7/02
  See application file for complete search history.

(56) References Cited

U.S. PATENT DOCUMENTS

2014/0279719 A1* 9/2014 Bohus ................... G06N 20/00
                                                  706/11
2018/0293509 A1* 10/2018 Sharma .................. H04L 67/02
(Continued)

*Primary Examiner* — Brian J. Gillis
*Assistant Examiner* — Chhian (Amy) Ling
(74) *Attorney, Agent, or Firm* — Richard T. Ogawa; Ogawa P.C.

(57) ABSTRACT

A method for dynamically allocating server resources includes receiving a request from a client system, wherein the request comprises a request for a first set of streaming data, providing from the server to the client system a first portion of streaming data from the first set of streaming data, wherein the first portion is associated with a first quality of service level, receiving user activity data from the client system for the first portion of the streaming data, determining a second quality of service level for a second portion of the streaming data from the first set of streaming data, providing from the server to the client system the second portion of streaming data from the first set of streaming data, wherein the second portion provided with the second quality of service level, and wherein the first quality of service level is different from the second quality of service level.

19 Claims, 8 Drawing Sheets

(56) References Cited

U.S. PATENT DOCUMENTS

2019/0057472 A1* 2/2019 Ross .................. H04L 67/306
2020/0057487 A1* 2/2020 Sicconi ............... G06F 3/011

* cited by examiner

COMPUTER BASED EDUCATION METHODS AND APPARATUS

CROSS REFERENCE TO RELATED PATENT APPLICATION

This application is a continuation of U.S. application Ser. No. 18/068,468, filed Dec. 19, 2022, now issued as U.S. Pat. No. 11,895,040 on Feb. 6, 2024, which is a continuation of U.S. application Ser. No. 16/268,282, filed Feb. 5, 2019, now issued as U.S. Pat. No. 11,533,272 on Dec. 20, 2022, which claims priority to U.S. Provisional Patent Application No. 62/627,143, filed on Feb. 6, 2018, which is hereby incorporated by reference in its entirety.

BACKGROUND OF INVENTION

The present invention relates to efficient network and computer hardware management. More specifically, the present invention relates to efficient resource management in a distributed computing environment. The present invention also relates generally to processing techniques for a distributed learning environment having course materials. In some embodiments, the invention provides a method and system for using a block chain configured on a public ledger for securing user information associated with an on-line course, hybrid on-line and on-campus course, a certification or degree, or other information in the field of education. More particularly, the invention provides a method and system using data capturing devices configured with artificial intelligence techniques for managing computing environment resources. The invention may provide securing storing a certification associated with a learning process associated with such method and system. In some embodiments, the invention provides a method and apparatus for generating and/or providing a crypto-coin using a learning module. Merely by way of example, the invention has been applied to a mobile computing device configured to a worldwide network of computers, however, the invention has many other applications.

"Education is the process of facilitating learning, or the acquisition of knowledge, skills, values, beliefs, and habits. Educational methods include storytelling, discussion, teaching, training, and directed research. Education frequently takes place under the guidance of educators, but learners may also educate themselves. Education can take place in formal or informal settings and any experience that has a formative effect on the way one thinks, feels, or acts may be considered educational. The methodology of teaching is called pedagogy. https://en.wikipedia.org/wiki/Education.

Education originally occurred through a one by one basis between teacher and student or master and apprentice or partner and associate. Classrooms eventually took over to teach children in masses from pre-school to higher education. Most recently, education has been implemented on-line via the Internet to facilitate learning for students. The inventor of the present invention believes there are some drawbacks with on-line learning. Some drawbacks for students include that because on-line students tend to learn in a solitary way, there is little, if any way to provide individualized learning and to help students succeed. Some drawbacks for the providers of on-line education systems includes that providers must purchase enough hardware or software services to serve the worst-case scenarios, e.g. every student.

Although education has progressed, it is desired that techniques to overcome difficulties in education, and more particularly learning are desired.

SUMMARY

According to the present invention, techniques related to course materials. In particular, the invention provides a method for using a block chain configured on a public ledger for securing user information associated with an on-line course, a certification or degree, or other information in the field of education. More particularly, the invention provides a method and system using data capturing devices configured with artificial intelligence techniques, and then securing and storing a certification associated with a learning process associated with such method and system. More particularly, the invention provides a method and apparatus for generating a crypto-coin using a learning module. Merely by way of example, the invention has been applied to a mobile computing device configured to a worldwide network of computers, however, the invention has many other applications.

In an example, the invention provides a computing apparatus. The apparatus has a bus device configured to be an interface for transmission of data. The apparatus has a micro processing device coupled to the bus device, an image capturing device coupled to the bus device, a memory resource coupled to the bus device, a wallet device provided in the memory resource or insertable as a separate device to be coupled to the bus device, a network interface coupled to the bus device, a power supply coupled to each of the bus device, the micro processing device, the image capturing device, the memory resource, and the network interface. The apparatus has a learning module coupled to the bus device. In an example, the learning module comprises a course module configured to output a course directed to a subject, the course comprising a plurality of templates and a video associated with the subject. The module has a sensor input handler coupled to a plurality of sensing devices, a video input handler coupled to the bus device, an artificial intelligence ("AI") module comprising a plurality of nodes numbered from 1 through N, where N is an integer of 10,000,000 or less, and an AI output each of the nodes being coupled the sensor input handler, the video input handler, or another input handler, an output handler coupled to the processing device, and configured to the AI output, a feedback process coupled to the output handler to intake information from the AI output and configured to reduce a number of cycles executed by the micro processing device from a first predetermined number range to a second predetermined number range to reduce a power consumption of the micro processing device from a first predetermined power range to a second predetermined power range. The apparatus has a miner module coupled to an output of the learning module to initial a process to determine if a coin device associated with a user of the course module by a user, issuing the coin device to the user, and storing the coin device in the wallet device, while the coin device is configured in an encrypted form.

In an example, the present invention provides a meta data processing apparatus for processing sensor inputs and providing feedback to a user for an on-line course. The apparatus has a housing configured with a display device. In an example, the display device is coupled to an input device for communicating text information from a user. The device has a processing device, such as a central processing unit, graphics processing unit, digital signal processing unit, micro controller or others.

In an example, the apparatus has a network interface coupled to the processing device. In an example, the network interface is configured to couple to a worldwide network of computers or a local network of computers. The apparatus has a memory resource coupled to the processing device and an application comprising a course module. In an example, the course module comprises a plurality of templates and at least one video file, and processes, each of which may be desirably tailored to a user based upon feedback from various processing modules.

In an example, the apparatus has an image capturing device coupled to the housing and configured to the processing device. In an example, the image capturing device is configured to capture an image of at least a facial expression in a first format of the user while interacting with the course module. The image capturing device can be a high-resolution camera that is suitable for capturing the image and has sufficient pixels to be processed.

In an example, the apparatus has a plurality of sensors for identifying a spatial orientation of the user while interacting with the course module. In an example, the sensor devices or plurality of external data capturing devices comprises a camera, a keyboard, an accelerometer sensor, an rf sensor, a gyroscope, a chemical sensor, a temperature sensor, a microphone, or other input device. Of course, there can be other variations, modifications, and alternatives.

In various embodiments, the apparatus may include a mixed reality or virtual reality headset that captures the user data using sensors from within a headset (e.g. Microsoft HoloLens and Mixed Reality platform, Magic Leap platform, Google Daydream, etc.) or that captures user data from a headset using external sensors, (e.g. HTC Vive, Oculus Rift) Various embodiments of headsets may provide spatial orientation data including where the user is viewing within an image (e.g. a lecturer, white board, etc.), where they are gazing within an image (e.g. equation, graph or diagram, etc.), duration of time viewing materials (e.g. reading a slide, or .pdf, etc.); voice data (e.g. a user repeating a foreign language phrase); and the like.

In some examples, the apparatus uses a variety of sensors, e.g. accelerometers, a camera, a pointing device, etc., to monitor the user's actions, while the user interacts with the course module. Depending upon the type of user action, an inference can be made as to whether the user is actively paying attention and/or whether the user is actively learning. Based upon such inferences, a number of actions may be taken to provide positive feedback to the user. The positive feedback may include the user being given "activity credits" or points that are convertible into prizes possibly having monetary value (e.g. .mp3 download, coffee cards, etc.); the user being given a crypto currency; the user being assigned to a blockchain mining process/rig; and the like, as will be described further below. In some examples, the user's actions may lead to an inference that the user is not actively paying attention and/or that the user is not actively learning. Based upon such inferences, a number of actions may be taken to regain the user's attention, such as modifying a volume of audio, modifying colors of a presentation, retrieving and presenting related or unrelated content to the user, and the like.

In some examples, the user's actions may lead to an inference that the user is not actively paying attention and/or that the user is not actively learning. Based upon such inferences, a number of actions may be taken to reduce computer or network resources, such as reducing frame rate or resolution of video, reducing a bit-rate of audio or video, decreasing quality of service, increasing latency, reducing communication data rate, and the like. In some embodiments, by monitoring the user's actions per each course module, e.g. during a lecture or series of lectures, a host system may determine patterns from multiple users' actions. These patterns may be used to determine a number of computer or network resources required for each lecture or series of lectures, as will be described below.

In an example, the natural language processor is configured to process the text information to identify a characteristic of the user in association with the course. Additionally, the apparatus has an artificial intelligence module coupled to the processing device. In an example, the artificial intelligence module comprises a neural network module comprising a plurality of nodes. In an example, the plurality of nodes can be numbered from 1–N, where N is an integer greater than 10 and less than 10,000,000, and possibly greater, depending upon the example. The plurality of nodes are coupled to respective sensors, image capturing device, natural language processor, or other information receiving devices, and an output. Of course, there can be other variations, modifications, and alternatives.

In an example, the apparatus has an output handler coupled to the output of the neural network module, the output handler configured to provide feedback to the user. The feedback comprises a plurality of characteristics to allow the user to achieve a predetermined score within a range for the course.

The above examples and implementations are not necessarily inclusive or exclusive of each other and may be combined in any manner that is non-conflicting and otherwise possible, whether they be presented in association with a same, or a different, embodiment or example or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above examples implementations are illustrative, rather than limiting.

DETAILED DESCRIPTION OF THE EXAMPLES

Figure 1:
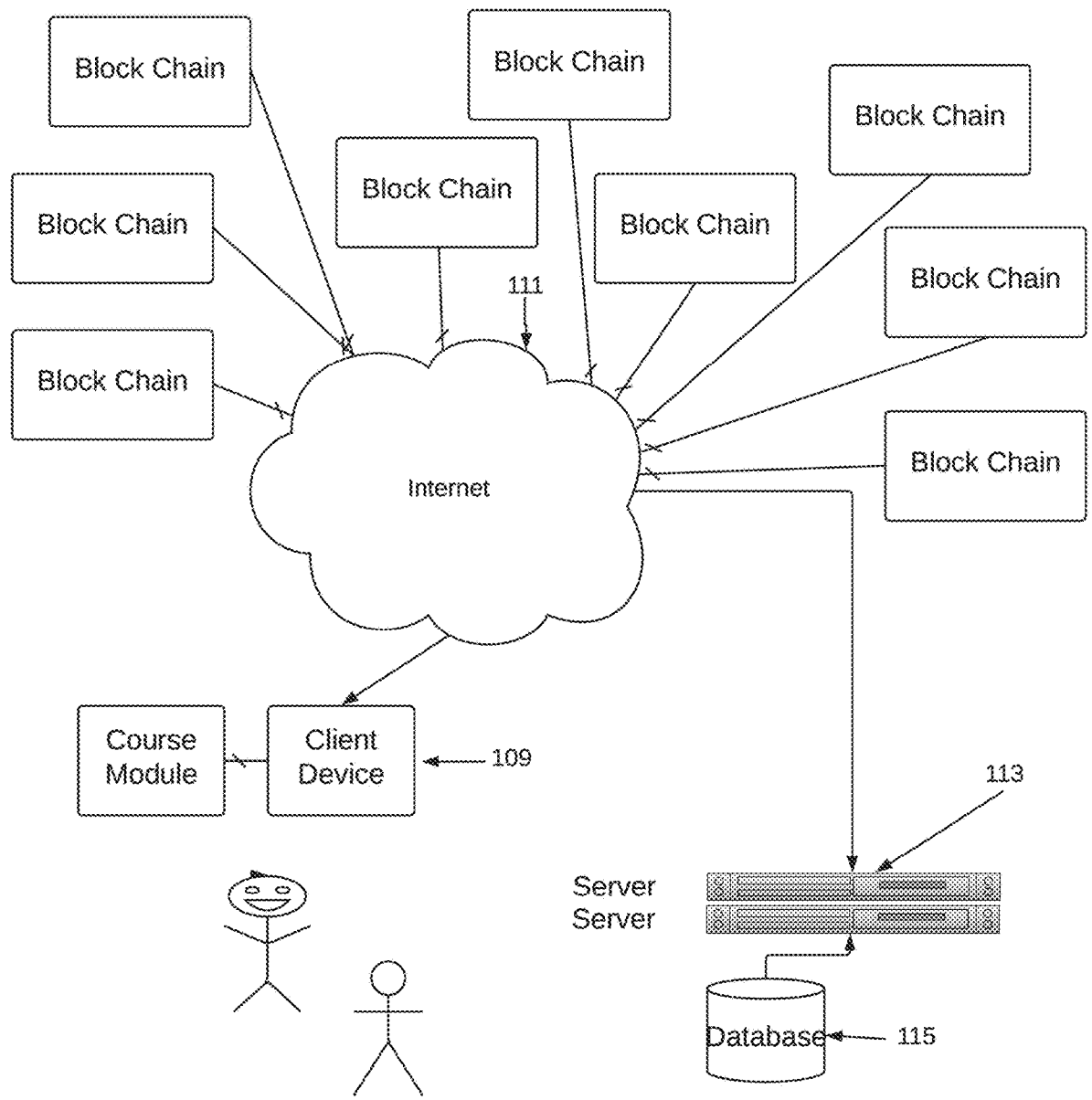
FIG. 1 is a simplified diagram with a network system according to an example of the present invention.

According to the present invention, techniques related to course materials are provided. In particular, the invention provides a method and system for using a block chain configured on a public ledger for securing user information associated with an on-line course, a certification or degree, or other information in the field of education. More particularly, the invention provides a method and system using data capturing devices configured with artificial intelligence techniques, and then securing storing a certification associated with a learning process associated with such method and system. More particularly, the invention provides a method and apparatus for generating a crypto-coin using a learning module. Merely by way of example, the invention has been applied to a mobile computing device configured to a world-wide network of computers, however, the invention has many other applications.

In an example, one or more of the definitions may be used in the following description of the specification.

EIs or Education Institutions means a non-profit, for-profit organizations, or entitie(s) that offer education or training IACs or Institutional Accreditation Credentials means verified receipt of passed reviews or diligence by qualified bodies, as defined by the relevant society, committee, regulatory agency, nonprofit body or entity, to the field of learning, standards, or other regulatory body.

EPs or Educational Products means courses or other educational offerings.

LIs means Learner Identification.

EICs or EI coins or tradeable currencies or points for learning products means a point or monetary entity associated with learning products.

In an example, the present invention provides a trustworthy authentication technique. In an example, the technique is for universities and colleges (that contain the key expertise and scholarship) to qualify, codify and ratify information that is "canonical" and therefore meritorious of inclusion in higher education or an educational program. In an example, all institutions, courses, or instructors will go through accreditation, which of course is run by the members of the system, not an outside entity.

In an example, the technique provides for creating a block chain of universities or colleges or entities that have been authenticated and accredited. In an example, other aspects that can be configured into a block chain include, but are not limited to, course materials, attendance records, transcripts, matriculation data, student data, faculty data, assessment scores, credit hours awarded, grades, acquisition of coins and other information. Rather than being in a central repository, any and all such information will be distributed on a public ledger across a worldwide network of computers in an encrypted manner A key will allow an authorized entity to access such information using conditions if needed, such as time, place, and duration. Of course, there can be other variations, modifications, and alternatives.

In various embodiments a system is disclosed having a network coupled to a remote server and a number of clients. In various embodiments, network may be the Internet, and may use wired and wireless communications mechanisms to transmit data between remote server and clients. Remote server may include a number of virtual and/or physical computer servers, and may be implemented on a cloud-based service, such as Amazon Web Services, or the like.

Remote server may include a data server, an application server, a resource optimization server (e.g. quality of service), a security server, as well as functional modules, described below. In various embodiments, data server may be used to provide data for (e.g. course work, lectures, presentation, etc.) and store data from (e.g. user response data, user resource utilization data, etc.) clients. Application server may be used to communicate with applications (e.g. web browser, desktop application, smart device application, etc.) running upon clients, to provide data to clients, and to receive data from clients. A resource optimization server is coupled to application server for receiving user resource utilization data (discussed further below) typically from each of clients and attempts to optimize the resources of remote server in response to the utilization data. Additionally, resource optimization server attempts to optimize the data bandwidth allocated for each of clients, depending upon the respective utilization data. In various embodiments, security server may be used to support the user logging into server. Other modules are described below.

In various embodiments, the data server, application server, the resource optimization server, security server, and other modules may be virtual machines upon a physical server, may be virtual machines implemented upon different physical servers, or combinations thereof. In some embodiments, clients may include laptop computers (e.g. Apple Macbook, Microsoft Surface), smart devices (e.g. Apple iPhone, Apple iPad), virtual or mixed reality systems (e.g. Oculus Rift, Google Daydream, Microsoft HoloLens, Magic Leap device), wearable device (e.g. Apple Watch, LG G Watch), or the like.

Figure 1A:
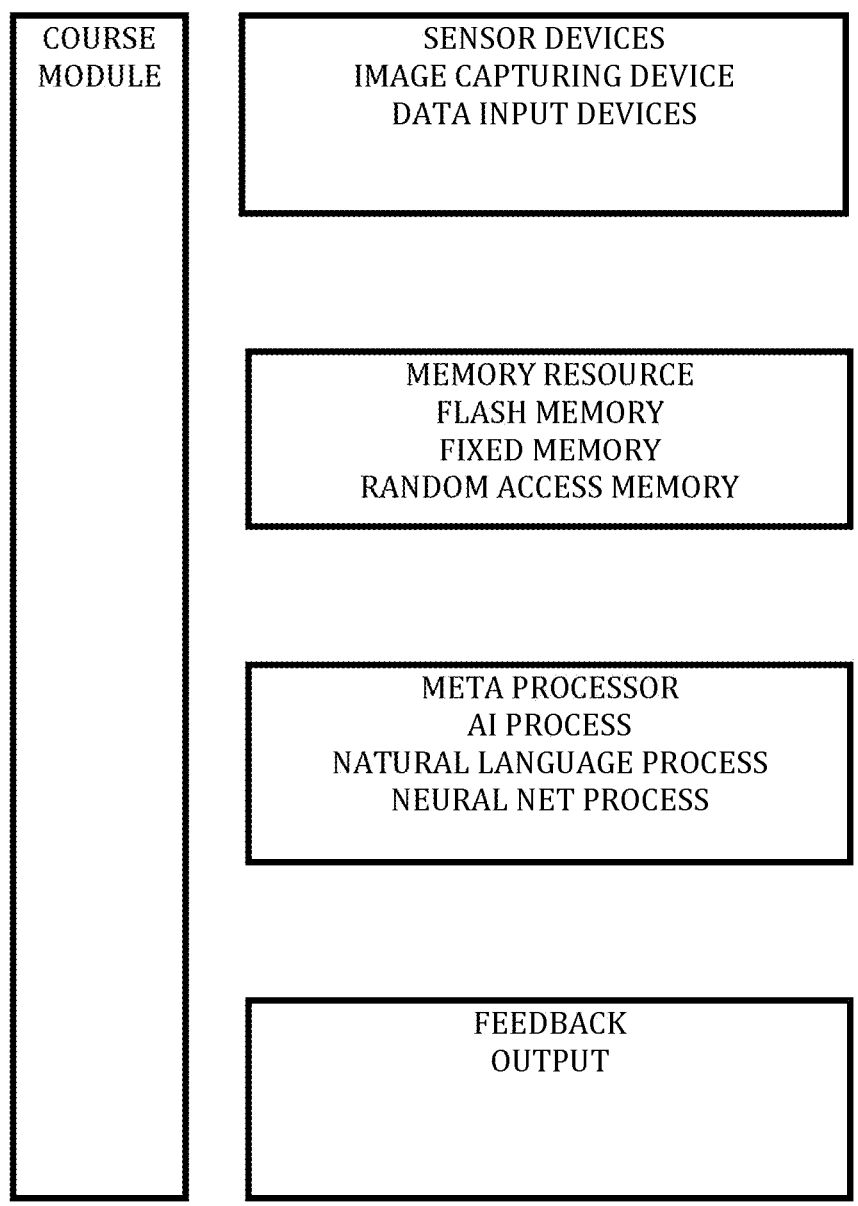
FIG. 1A is a simplified diagram of a meta processing system for learning according to an example of the present invention.

FIG. 1A is a simplified diagram of a meta processing system for learning according to an example of the present invention. As shown, the system has a course module, which includes templates, video, and other information. The course can be directed to a variety of subjects including but not limited to science, math, English, history, psychology, engineering, business, finance, accounting, or any other college course subject.

As shown, the course module is configured with a plurality of sensor devices, an image capturing device, data input device, virtual reality (VR) (including augmented reality, mixed reality), or the like. In an example, the sensor devices or plurality of external data capturing devices comprises a camera, a keyboard, an accelerometer sensor, an rf sensor, a gyroscope, a chemical sensor, a temperature sensor, a microphone, VR device, or other input device. Of course, there can be other variations, modifications, and alternatives.

In an example, the system has a meta processor. The meta processor includes an artificial intelligence process, a natural language process, and neural net process each of which can be run configured with each other or independently from each other.

In an example, the invention provides a method of using the meta module process of capturing data and processing the data for feedback to a user, e.g., learner, student, or other human entity. In an example, the method includes providing information related to a course in a first format. In an example, the course can be sourced from an off-line classroom course.

In an example, the method includes transferring the information in the first format to a server device. The server device can be coupled to a plurality of computers on a worldwide network of computers, such as the Internet. In an example, the method includes storing the information in the first format into a memory resource coupled to the server device.

In an example, the method includes processing the information related to the course on the server device to convert the course into a second format, the second format comprising a plurality of templates and a video. The second format is suitable for using the course in an on-line manner.

The method configures the course in the second format with a meta module. As noted, the meta module comprises an artificial intelligence module. In an example, the artificial intelligence module comprises a plurality of input interfaces each of the input interfaces coupled to a node. In an example, each of the nodes comprises a weighing function. In an example, each of the nodes is coupled to an output interface.

In an example, the artificial intelligence module comprises a neural network process configured on a neural network process, wherein the plurality of nodes comprises at least 1 million nodes. In an example, the artificial intelligence module comprises a neural network process configured on a processing device.

In an example, the method includes configuring the course coupled to the artificial intelligence module to a plurality of external data capturing devices. Each of the plurality of external data captures devices being spatially disposed on a mobile computing device. In an example, the mobile computing device is coupled to the worldwide network of computers.

In an example, the method includes initiating use of the course in the second format coupled to the artificial intelligence module from the mobile computing device and capturing data from a user of the mobile computing device from each of the plurality of external data capturing devices, while the user is actively interacting with the course in the second format from the mobile computing device.

In an example, the method includes transferring data from each of the plurality of external data capturing devices from the mobile computing device to the artificial intelligence module and, thereafter, outputting a feedback from the artificial intelligence module to the user of the course.

In an example, the method also includes finalizing use of the course in the second format; and initiating a test associated with the course. Optionally, the method includes finalizing use of the course in the second format; initiating a test associated with the course; passing the test; and transferring a credit for the course to the user of the mobile device and the course. Of course, there can be other variations, modifications, and alternatives.

Optionally, the method can also include transferring spatial movement information from a wearable device to the mobile computing device. The wearable device can be a watch, a suit, a vest, a headset, a pair of glasses, a pair of pants, shoes, or other wearable device. The wearable device can include a plurality of sensing devices spatially disposed on the device. A wireless or wired transceiver or transmitter can transmit information from each of the sensors to the meta processor.

In an example, the method includes finalizing use of the course in the second format. The method includes initiating a test associated with the course and passing the test (or taking it over if the user does not pass the course). The method includes transferring a credit for the course to the user of the mobile device and the course, configuring the credit with a time and date stamp and other information into a block of information, and adding the block of information into a chain of other blocks of information to form a block chain associated with the user in an encrypted format distributed on a public ledger configuration provided on a worldwide network of computers.

In an example, the course module and other elements can be implemented using a mobile device. In an example, the course module and other elements can be delivered using a mobile device. In an example, the mobile device is a lap top computer, a tablet, an iPad, a Smart phone, or other mobile device. Of course, there can be other variations, modifications, and alternatives.

In an alternative example, the present invention provides a meta data processing apparatus for processing sensor inputs and providing feedback to a user for an on-line course. The apparatus has a housing configured with a display device. In an example, the display device is coupled to an input device for communicating text information from a user. The device has a processing device, such as a central processing unit, graphics processing unit, digital signal processing unit, micro controller or others.

In an example, the apparatus has a network interface coupled to the processing device. In an example, the network interface is configured to couple to a world wide network of computers or a local network of computers. The apparatus has a memory resource coupled to the processing device and an application comprising a course module. In an example, the course module comprises a plurality of templates and at least one video file, and processes, each of which may be desirably tailored to a user based upon feedback from various processing modules.

In an example, the apparatus has an image capturing device coupled to the housing and configured to the processing device. In an example, the image capturing device is configured to capture an image of at least a facial expression in a first format of the user while interacting with the course module. The image capturing device can be a high-resolution camera that is suitable for capturing the image and has sufficient pixels to be processed.

In an example, the apparatus has a plurality of sensors for identifying a spatial orientation of the user while interacting with the course module. In an example, the sensor devices or plurality of external data capturing devices comprises a camera, a keyboard, an accelerometer sensor, an rf sensor, a gyroscope, a chemical sensor, a temperature sensor, a microphone, or other input device. Of course, there can be other variations, modifications, and alternatives.

In an example, the apparatus has a natural language processor configured for processing information from the text information while the user is interacting with the course module. In an example, the natural language processor is configured to process the text information to identify a characteristic of the user in association with the course. Additionally, the apparatus has an artificial intelligence module coupled to the processing device. In an example, the artificial intelligence module comprises a neural network module comprising a plurality of nodes. In an example, the plurality of nodes can be numbered from 1–N, where N is an integer greater than 10 and less than 10,000,000, and possibly greater, depending upon the example. The plurality of nodes are coupled to respective sensors, image capturing device, natural language processor, or other information receiving devices, and an output. Of course, there can be other variations, modifications, and alternatives.

In an example, the apparatus has an output handler coupled to the output of the neural network module, the output handler configured to provide feedback to the user.

The feedback comprises a plurality of characteristics to allow the user to achieve a predetermined score within a range for the course.

In an example, the course is related to science, math, English, history, psychology, engineering, business, finance, accounting, or any other college course subject.

In an example, the apparatus includes a wearable device comprising a set of sensors to characterize movement, orientation, temperature, heart rate, breathing rate, oxygen, and other parameters of the user while interacting with the course, the wearable device being coupled to an input of the artificial intelligence module.

In an example, the housing is shock proof. In an example, the housing is water proof.

In an example, the neural network module is configured to receive information from the image capturing device and output a learning characteristic of the user.

In an example, the neural network module is configured to receive information associated with a facial expression and an eye response from the image capturing device and output a learning characteristic of the user.

In an example, the method includes transferring a spatial location information and a time information to the artificial intelligence module.

In a preferred example, an output handler coupled to the output of the neural network module, the output handler configured to provide feedback to the user and configure the myamesite™ course. The myamesite course has been configured with feedback to create a specialized or personalized course for the user or student. Further details of the present method, apparatus, and system can be found throughout the present specification and more particularly below.

FIG. 1 is a simplified diagram with a network system according to an example of the present invention. As shown, the network system has a course module, which is coupled to a client device 109, which is coupled to a world wide network of computers, such as the Internet 111. In an example, the Internet comprises a plurality of server devices 113 coupled to memory resource 115 or database. The system also includes a plurality of servers configured with a plurality of block chain information, as shown.

In an example, the block chain information can be provided by a blockchain formation, which can be described in Wikipedia.com. In an example, a main chain consists of the longest series of blocks from the genesis block to the current block. Orphan blocks exist outside of the main chain. In an example, a blockchain is a growing list of records, called blocks, which are linked using cryptography. Each block contains a cryptographic hash of the previous block, a timestamp, and transaction data (generally represented as a merkle tree root hash or other type of hash or configuration). By design, a blockchain is resistant to modification of the data. The blockchain is an open, distributed ledger that can record transactions between two parties efficiently and in a verifiable and permanent way. For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. Although blockchain records are not unalterable, blockchains may be considered secure by design and exemplify a distributed computing system with high Byzantine fault tolerance. Decentralized consensus has therefore been claimed with a blockchain. Of course, there can be other variations, modifications, and alternatives.

Figure 2:
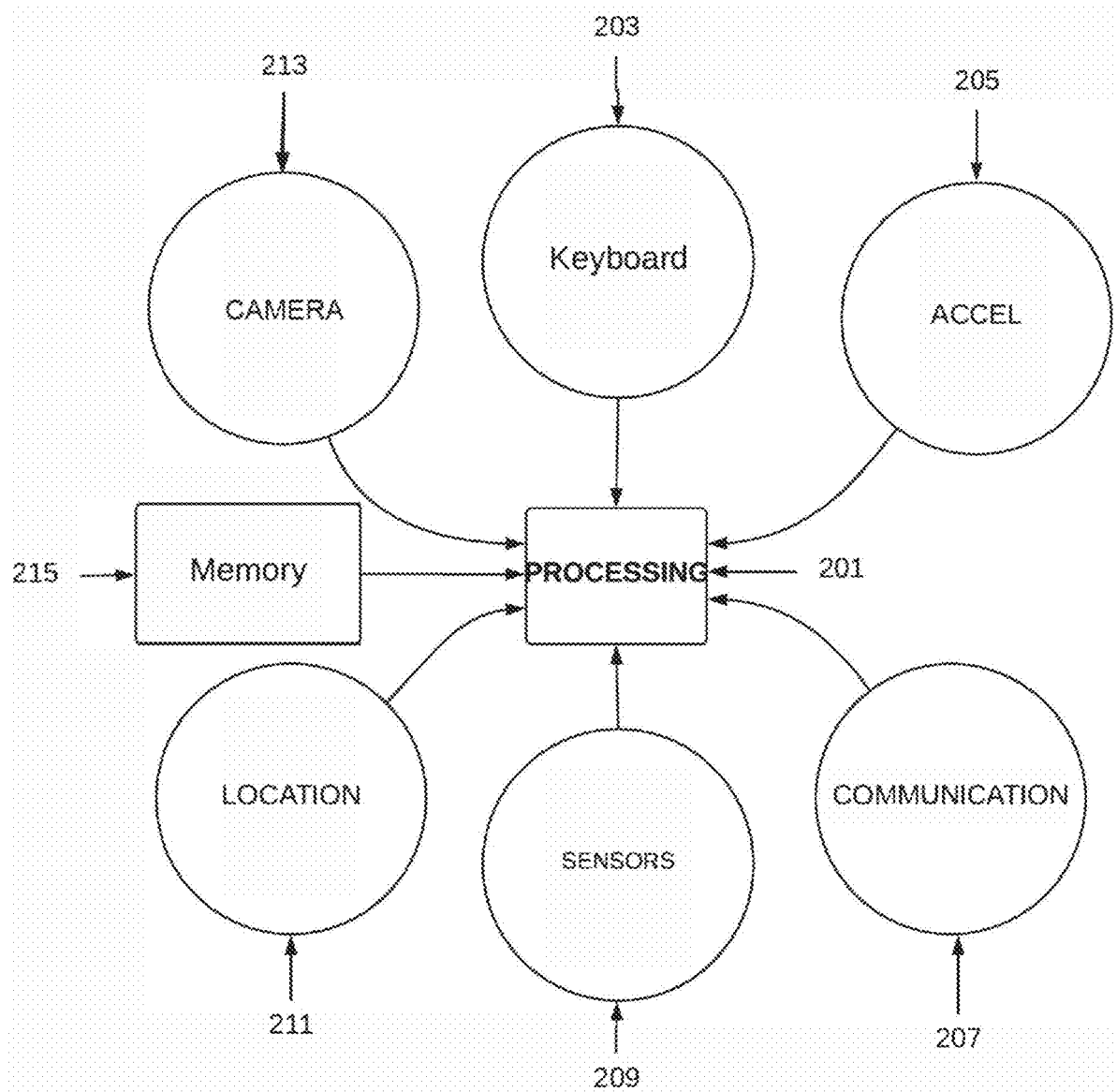
FIG. 2 is a more detailed diagram of a processing engine with input devices according to an example of the present invention.

FIG. 2 is a more detailed diagram of a processing engine with input devices according to an example of the present invention. In an example, the processing engine 201 is coupled to input devices 203, 205, 207, 209, 211, 214, among others. The processing engine interfaces with a memory resource, such as storage 215.

In an example, the processing engine is configured with a meta data processing apparatus for processing sensor inputs and providing feedback to a user for an on-line course. The apparatus has a housing configured with a display device. In an example, the display device is coupled to an input device for communicating text information from a user. The device has a processing device, such as a central processing unit, graphics processing unit, digital signal processing unit, micro controller or others.

In an example, the apparatus has a network interface 207 coupled to the processing device. In an example, the network interface is configured to couple to a world wide network of computers or a local network of computers. The apparatus has a memory resource 215 coupled to the processing device and an application comprising a course module. In an example, the course module comprises a plurality of templates and at least one video file, and processes, each of which may be desirably tailored to a user based upon feedback from various processing modules.

In an example, the apparatus has an image capturing device coupled to the housing and configured to the processing device. In an example, the image capturing device is configured to capture an image of at least a facial expression in a first format of the user while interacting with the course module. The image capturing device can be a high resolution camera that is suitable for capturing the image and has sufficient pixels to be processed.

In an example, the apparatus has a plurality of sensors for identifying a spatial orientation of the user while interacting with the course module. In an example, the sensor devices or plurality of external data capturing devices comprises a camera, a keyboard, an accelerometer sensor, an rf sensor, a gyroscope, a chemical sensor, a temperature sensor, a microphone, or other input device. Of course, there can be other variations, modifications, and alternatives.

In an example, the apparatus has a natural language processor configured for processing information from the text information while the user is interacting with the course module. In an example, the natural language processor is configured to process the text information to identify a characteristic of the user in association with the course. Additionally, the apparatus has an artificial intelligence module coupled to the processing device. In an example, the artificial intelligence module comprises a neural network module comprising a plurality of nodes. In an example, the plurality of nodes can be numbered from 1–N, where N is an integer greater than 10 and less than 10,000,000, and possibly greater, depending upon the example. The plurality of nodes are coupled to respective sensors, image capturing device, natural language processor, or other information receiving devices, and an output. Of course, there can be other variations, modifications, and alternatives.

In an example, the apparatus has an output handler coupled to the output of the neural network module, the output handler configured to provide feedback to the user. The feedback comprises a plurality of characteristics to allow the user to achieve a predetermined score within a range for the course.

In an example, the course is related to science, math, English, history, psychology, engineering, business, finance, accounting, or any other college course subject.

In an example, the apparatus includes a wearable device comprising a set of sensors to characterize movement, orientation, temperature, heart rate, breathing rate, oxygen, and other parameters of the user while interacting with the course, the wearable device being coupled to an input of the artificial intelligence module.

In an example, the housing is shock proof.

In an example, the neural network module is configured to receive information from the image capturing device and output a learning characteristic of the user.

In an example, the neural network module is configured to receive information associated with a facial expression and an eye response from the image capturing device and output a learning characteristic of the user.

In an example, the method includes transferring a spatial location information and a time information to the artificial intelligence module.

In a preferred example, the an output handler coupled to the output of the neural network module, the output handler configured to provide feedback to the user and configure the myamesite™ course. The myamesite course has been configured with feedback to create a specialized or personalized course for the user or student.

Figure 3:
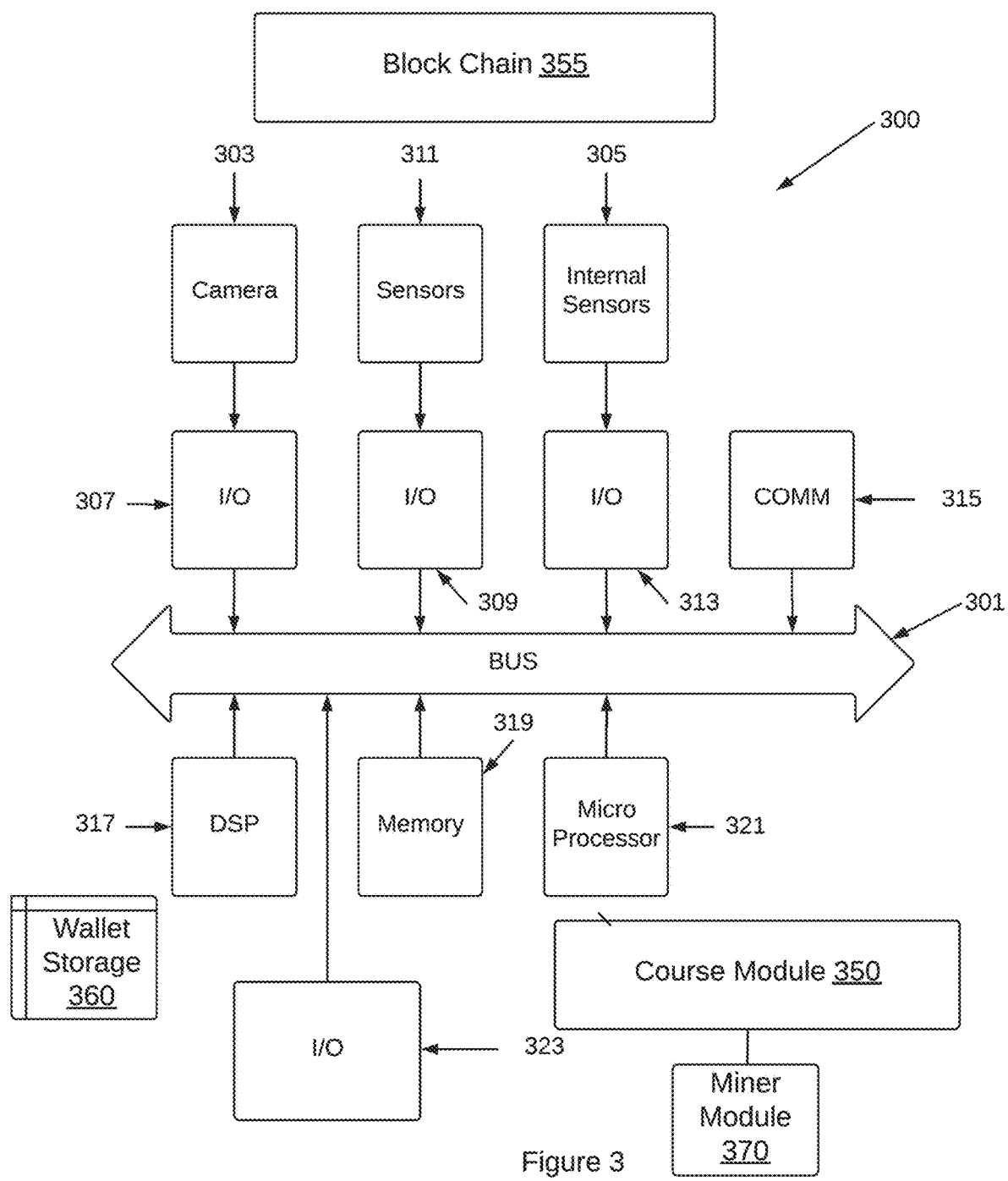
FIG. 3 is a more detailed diagram of a processing system according to an example of the present invention.

FIG. 3 is a more detailed diagram of a processing system 300 according to an example of the present invention. As shown, the system has a bus 301 that communicates with input output devices 307, 309, 313. The input output devices is coupled to camera 303, sensors 311, and internal sensors 305. The bus also has communication module 315, a digital signal processor 317, other input output devices 323, memory resource 319, and microprocessor 321. The bus also communications with course module 350, which has been previously explained throughout this specification.

In an example, the system also has a block chain process and related block chain information 355 that is distributed through a network. In an example, the system can take learning data, and perform a block chain process, including encryption and distribution for public or selective viewing.

In an example, the system has a wallet 360 provided in memory device on a client or other user device, including a server or other computing device. The wallet is secured and can be removable from the system both electrically and mechanically. In an example, the system also has a miner module coupled to a processing device via a bus or other device. Of course, there can be other variations, modifications, alternatives.

In an example, the system can be configured using a secure learning experience using a encrypted encoded network. In an example, the method includes configuring information using a course module derived from an interactive course platform coupled to a server and a network. In an example, the course module comprises information provided from a human user coupled to a plurality of sensing devices, including at least an image capturing device, a motion sensor, and an ambient sensor. For security, the method assigns a time and date stamp on the course module, and then processes information using the course module to validate it against a predetermined quality metric, coding format, and ratification information to configure a second course module in a canonical format. In an example, the method processes information using the course module in the second format using an encryption process. The method then configures information using the course module on a public ledge in a block chain configuration.

Figure 4:
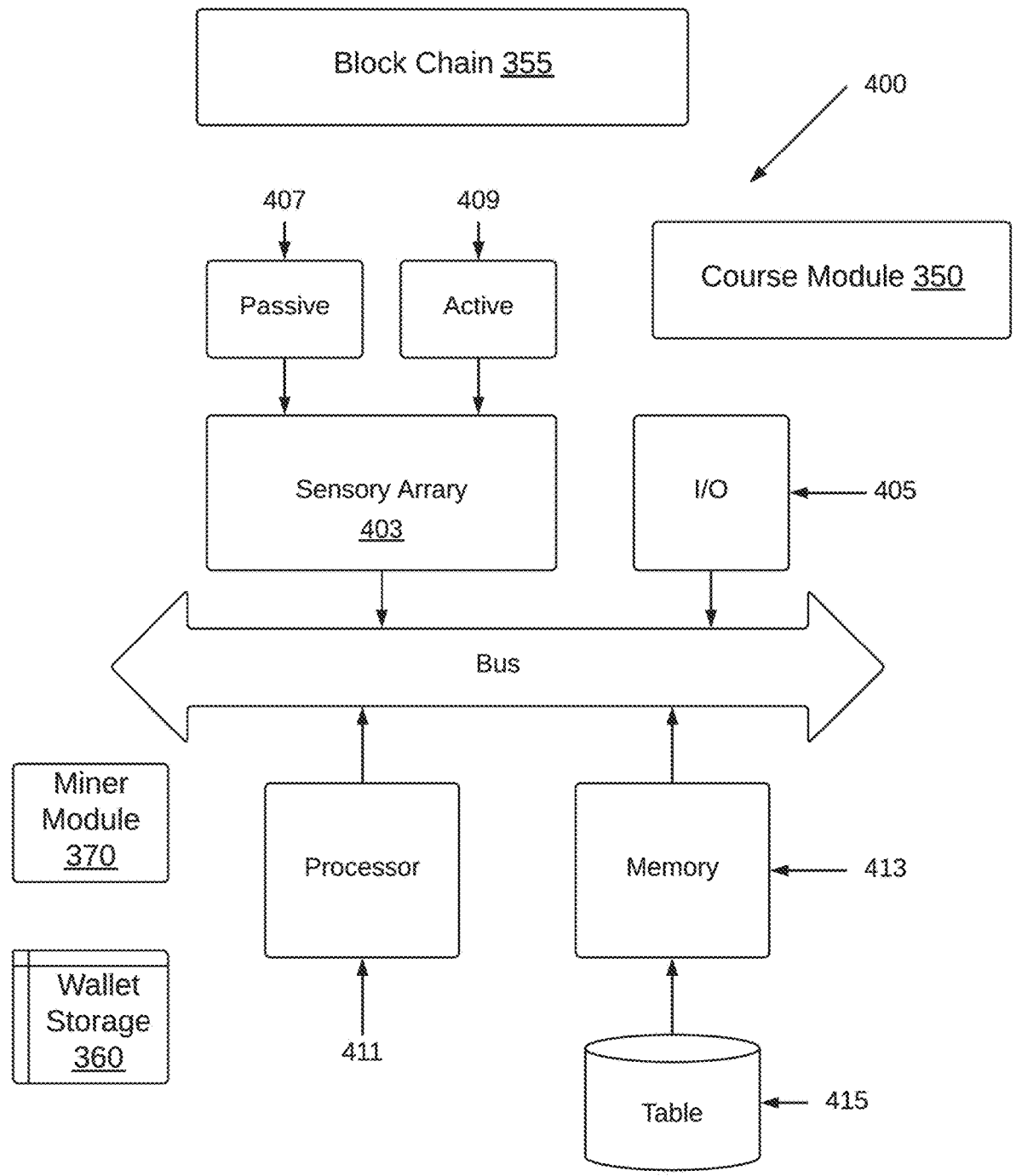
FIG. 4 is a more detailed diagram of an alternative processing system according to an example of the present invention.

FIG. 4 is a more detailed diagram of an alternative processing system 400 according to an example of the present invention. As shown, the system has a bus that communicates to a sensor array 403, which includes both passive sensors 407 and active sensors 409. The bus also has input output device 405, processor 411, memory resource 413, which is coupled to mass storage 415 including documents, templates, and other configurations. A course module 350 is coupled to the bus. In an example, the system also has a block chain process and related block chain information 355 that is distributed through a network. In an example, the system can take learning data, and perform a block chain process, including encryption and distribution for public or selective viewing.

In an example, the system has a wallet 360 provided in memory device on a client or other user device, including a server or other computing device. The wallet is secured and can be removable from the system both electrically and mechanically. In an example, the system also has a miner module coupled to a processing device via a bus or other device. Of course, there can be other variations, modifications, alternatives.

Figure 5:
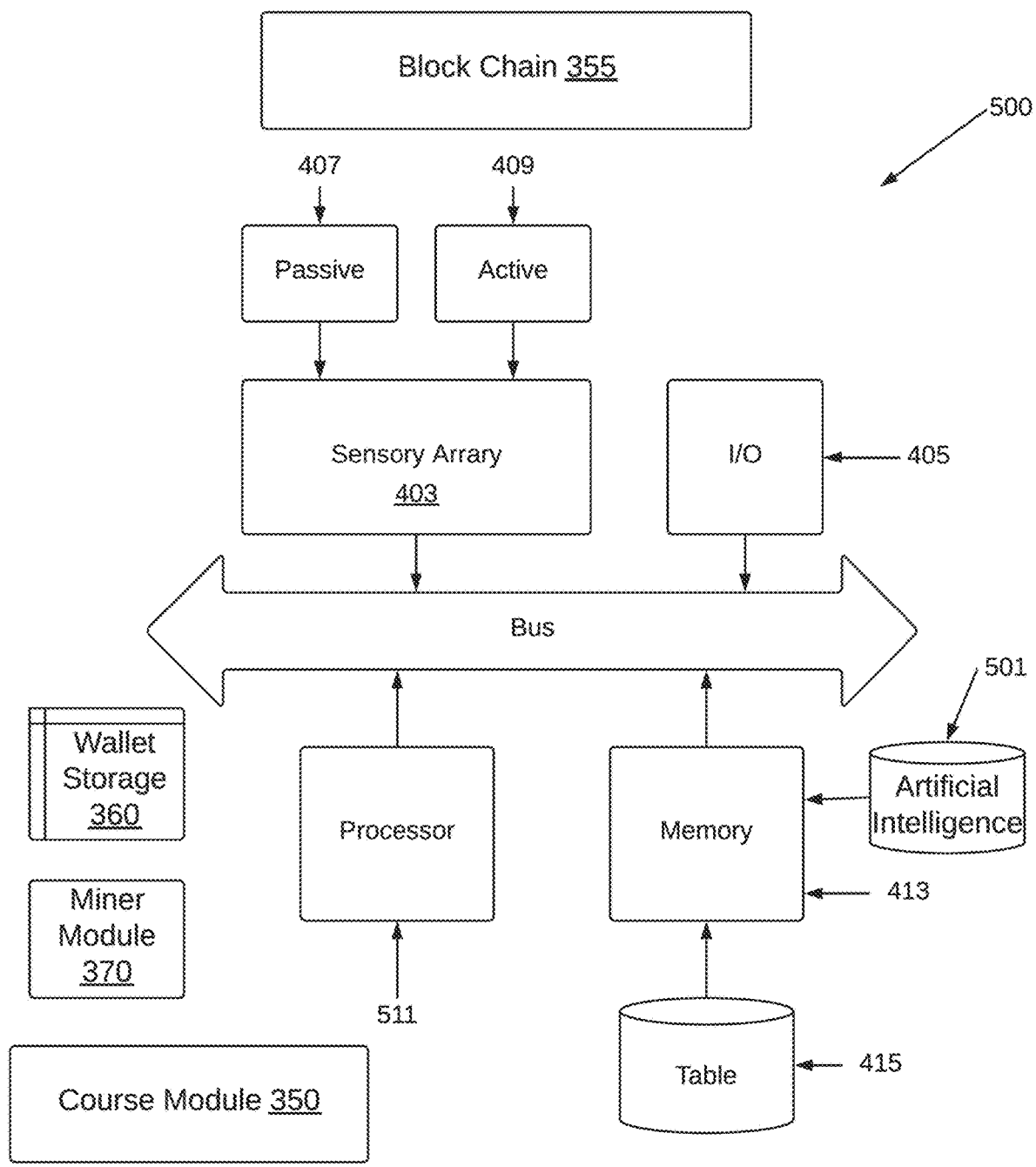
FIG. 5 is a more detailed diagram of an alternative processing system according to an example of the present invention.

FIG. 5 is a more detailed diagram of an alternative processing system 500 according to an example of the present invention. As shown, the system has a bus that communicates to a sensor array 403, which includes both passive sensors 407 and active sensors 409. The bus also has input output device 405, processor 511, which can include artificial intelligence processors, digital signal processors, and other processors, memory resource 413, which is coupled to mass storage 415 including documents, templates, and other configurations. An artificial intelligence module 501 is also coupled to the memory resource. The artificial intelligence module includes configurations that are learned and used in accordance to this example with the course module 350. A course module is coupled to the bus. In an example, the system also has a block chain process and related block chain information 355 that is distributed through a network. In an example, the system can take learning data, and perform a block chain process, including encryption and distribution for public or selective viewing.

In an example, the system has a wallet 360 provided in memory device on a client or other user device, including a server or other computing device. The wallet is secured and can be removable from the system both electrically and mechanically. In an example, the system also has a miner module coupled to a processing device via a bus or other device. Of course, there can be other variations, modifications, alternatives.

Figure 6:
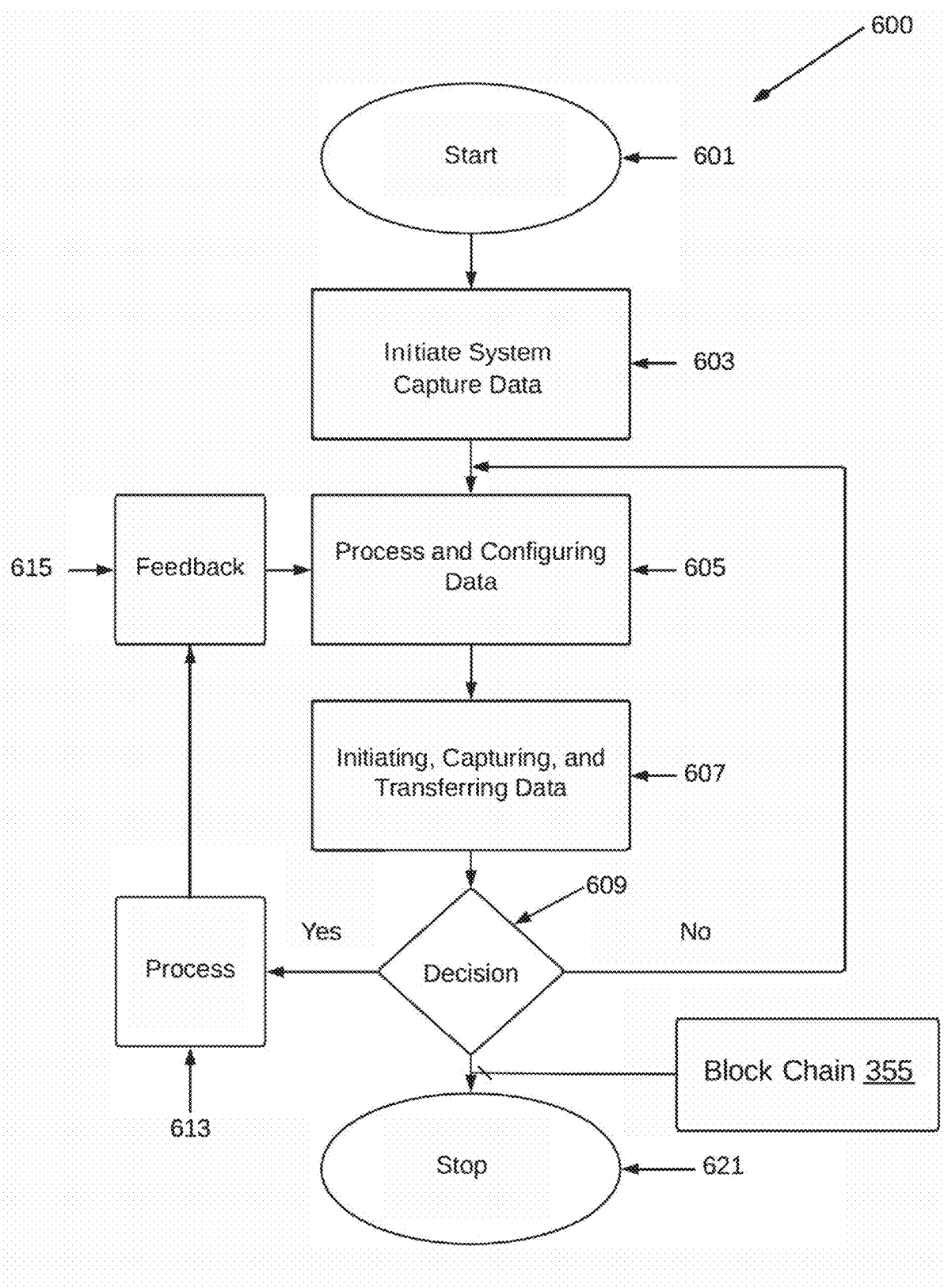
FIG. 6 is a simplified flow diagram of an integrated data processing process according to an example of the present invention.

FIG. 6 is a simplified flow diagram 600 of an integrated data processing process according to an example of the present invention. In an example, the method begins with start, step 601. In an example, the invention provides a method of using the meta module process of capturing data and processing the data for feedback to a user, e.g., learner, student, or other human entity. In an example, the present process provides for a single integrated application to perform various processes that can be implemented using a combination of hardware and software. In an example, the method includes providing information related to a course in a first format, such as a video, a text book, or any combination thereof. In an example, the course can be sourced from an off-line class-room course.

In an example, the method includes transferring the information in the first format to a server device. The server device can be coupled to a plurality of computers on a world wide network of computers, such as the Internet. In an example, the method includes storing the information in the first format into a memory resource coupled to the server device.

In an example, the method includes processing the information related to the course on the server device to convert the course into a second format, the second format comprising a plurality of templates and a video. The second format is suitable for using the course in an on-line manner through the Internet and client devices.

The method configures the course in the second format with a meta module. As noted, the meta module comprises an artificial intelligence module. In an example, the artificial intelligence module comprises a plurality of input interfaces each of the input interfaces coupled to a node. In an example, each of the nodes comprises a weighing function. In an example, each of the nodes is coupled to an output interface.

In an example, the artificial intelligence module comprises a neural network process configured on a neural network process, wherein the plurality of nodes comprises at least 1 million nodes. In an example, the artificial intelligence module comprises a neural network process configured on a processing device.

In an example, the method initiates 603 capturing data from a plurality of sensing devices, which can be internal or external, passive, or active in an example, to teach the neural network process including the plurality of nodes with selected weighing functions.

In an example, the method includes configuring 605 the course coupled to the artificial intelligence module to a plurality of external data capturing devices, each of the devices being associated with a weighing function for the neural network process. Each of the plurality of external data captures devices being spatially disposed on a mobile computing device or other device. In an example, the mobile computing device is coupled to the world wide network of computers.

In an example, the method includes initiating 607 use of the course in the second format coupled to the artificial intelligence module from the mobile computing device, among other client devices, and capturing data from a user of the mobile computing device from each of the plurality of external data capturing devices, while the user is actively interacting with the course in the second format from the mobile computing device.

In an example, while using the module associated with the course, if any rules and/or decisions related to neural network process is triggered, step 609, the method processes information 613 associated with such rules and/or decisions, and provides feedback 615 to the user in an example. As further shown, n an example, the method includes transferring data from each of the plurality of external data capturing devices from the mobile computing device to the artificial intelligence module and, thereafter, outputting a feedback 615 from the artificial intelligence module to the user of the course.

In an example, the method also includes finalizing use of the course in the second format; and initiating a test associated with the course. Optionally, the method includes finalizing use of the course in the second format; initiating a test associated with the course; passing the test; and transferring a credit for the course to the user of the mobile device and the course. The method ends at stop, step 621. Of course, there can be other variations, modifications, and alternatives.

Optionally, the method can also includes transferring spatial movement information from a wearable device to the mobile computing device. The wearable device can be a watch, a suit, a vest, a headset, a pair of glasses, a pair of pants, shoes, or other wearable device. The wearable device can include a plurality of sensing devices spatially disposed on the device. A wireless or wired transceiver or transmitter can transmit information from each of the sensors to the meta processor.

In an example, the course module and other elements can be implemented using a mobile device. In an example, the mobile device is a lap top computer, a tablet, an iPad, a Smart phone, or other mobile device. Of course, there can be other variations, modifications, and alternatives.

Figure 7:
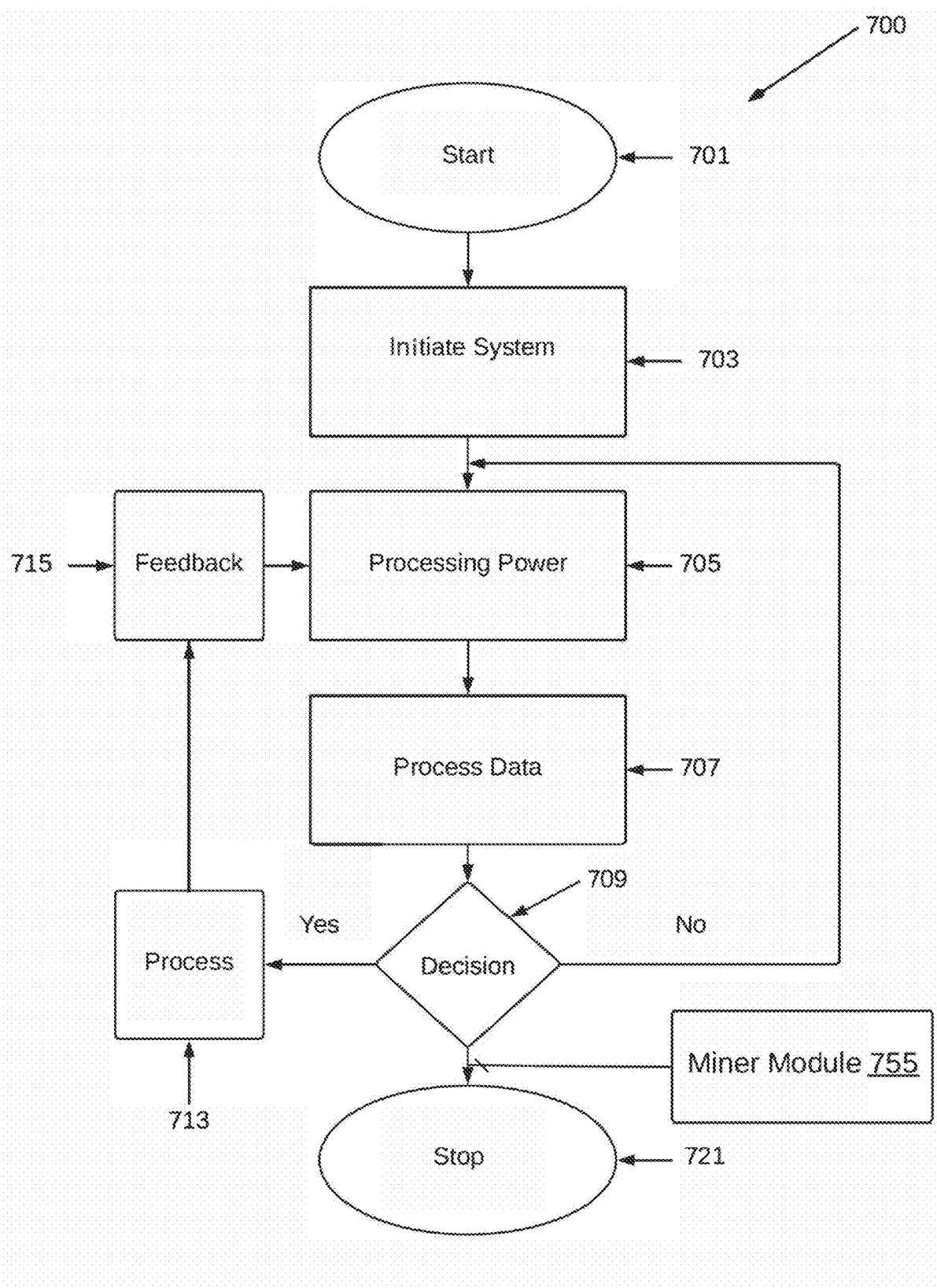
FIG. 7 is a simplified flow diagram of a power management and mining process according to an example of the present invention.

FIG. 7 is a simplified flow diagram of a power management and mining process according to an example of the present invention. As shown, the method 700 begins with start, step 701, initiate system, step 703, processing power, step 705, process data, step 707, decision, step 709, with no and yes branch, including process, step 713, feedback, step 715, and stop, step 721, and minor module, step 755. The process is a method for operating a computing apparatus. In an example, the apparatus has a bus device configured to be an interface for transmission of data, a micro processing device coupled to the bus device, an image capturing device coupled to the bus device, a memory resource coupled to the bus device, and a wallet device provided in the memory resource or insertable as a separate device to be coupled to the bus device. In an example, crypto currency can be stored in the wallet device. In an example, the apparatus has a network interface coupled to the bus device, a power supply coupled to each of the bus device, the micro processing device, the image capturing device, the memory resource, and the network interface.

In an example, a learning module coupled to the bus device. In an example, the learning module comprises a course module configured to output a course directed to a subject. In an example, the course comprising a plurality of templates and a video associated with the subject.

In an example the apparatus has a sensor input handler coupled to a plurality of sensing devices, a video input handler coupled to the bus device, and an artificial intelligence ("AI") module comprising a plurality of nodes numbered from 1 through N, where N is an integer of 10,000,000 or less, and an AI output each of the nodes being coupled the sensor input handler, the video input handler, or another input handler.

In an example, an output handler is coupled to the processing device, and configured to the AI output.

As shown, the method initiates a system having the apparatus, step 703. The method processes power for the system, including the microprocessing devices, 705. In an example, the method also processes data using a variety of artificial intelligence processes, step 707.

In an example, the method performs various decisions step 709. In an example, the method processes the decision, such as a feedback process, step 713. In an example, the method includes a feedback process 715 coupled to the output handler to intake information from the AI output and configured to reduce a number of cycles executed by the micro processing device from a first predetermined number range to a second predetermined number range to reduce a power consumption of the micro processing device from a first predetermined power range to a second predetermined power range.

In an example, the method also performs a mining process using a miner module, 755, in an example. The miner module is coupled to an output of the learning module to initial a process to determine if a coin device associated with a user of the course module by a user, issuing the coin device to the user, and storing the coin device in the wallet device, while the coin device is configured in an encrypted form. In an example, the method outputs the issued coin device.

In an example, the feedback process comprises a plurality of characteristics to allow the user to achieve a predetermined score within a range for the course. In an example, the learning module comprising a natural language processor is configured to process the text information to identify a characteristic of the user in association with the course. In an example, the plurality of nodes comprises at least 1 million nodes; and wherein the plurality of sensors comprises a camera, a keyboard, an accelerometer sensor, an rf sensor, a gyroscope, a chemical sensor, a temperature sensor, a microphone, or other input device. In an example, the course is related to science, math, English, history, psychology, engineering, business, finance, accounting, or any other college course subject.

In an example, the apparatus further comprises a wearable device comprising a set of sensors to characterize movement, orientation, temperature, heart rate, breathing rate, oxygen, and other parameters of the user while interacting with the course, the wearable device being coupled to an input of the artificial intelligence module. In an example the housing is shock proof. In an example, the artificial intelligence module comprises a neural network module configured to receive information from the image capturing device and output a learning characteristic of the user. In an example, the artificial intelligence module comprises a neural network module configured to receive information associated with a facial expression and an eye response from the image capturing device and output a learning characteristic of the user. In an example, the apparatus has a time and location device coupled to the learning module and configured to transfer a spatial location information and a time information to the artificial intelligence module. In an example, the first predetermined power range is associated with a first mode associated with the course, and the second predetermined power range is associated with a second mode associated with the course; and each of the first mode and the second mode is one of a plurality of modes numbered from 1 to M, where M is an integer greater than 10. In an example, the coin device is one of a plurality of coin devices, the coin device is configured to be exchanged with a Bitcoin, an Ether, or other cryptocurrency. Of course, there can be other variations, modifications, and alternatives.

In an example, various hardware elements of the invention can be implemented using a smart phone with a capture image of a user according to an embodiment of the present invention. As shown, the smart phone includes a housing, display, and interface device, which may include a button, microphone, or touch screen. Preferably, the phone has a high-resolution camera device, which can be used in various modes. An example of a smart phone can be an iPhone from Apple Computer of Cupertino California. Alternatively, the smart phone can be a Galaxy from Samsung or others.

In an example, the smart phone includes the following features (which are found in an iPhone from Apple Computer, although there can be variations), see www.apple.com, which is incorporated by reference. In an example, the phone can include 802.11b/g/n Wi-Fi (802.11n 2.4 GHz only), Bluetooth 2.1+EDR wireless technology, Assisted GPS, Digital compass, Wi-Fi, Cellular, Retina display, 5-megapixel iSight camera, Video recording, HD (720p) up to 30 frames per second with audio, Photo and video geotagging, Three-axis gyro, Accelerometer, Proximity sensor, and Ambient light sensor. Of course, there can be other variations, modifications, and alternatives.

An exemplary electronic device may be a portable electronic device, such as a media player, a cellular phone, a personal data organizer, or the like. Indeed, in such embodiments, a portable electronic device may include a combination of the functionalities of such devices. In addition, the electronic device may allow a user to connect to and communicate through the Internet or through other networks, such as local or wide area networks. For example, the portable electronic device may allow a user to access the internet and to communicate using e-mail, text messaging, instant messaging, or using other forms of electronic communication. By way of example, the electronic device may be a model of an iPod having a display screen or an iPhone available from Apple Inc.

In certain embodiments, the device may be powered by one or more rechargeable and/or replaceable batteries. Such embodiments may be highly portable, allowing a user to carry the electronic device while traveling, working, exercising, and so forth. In this manner, and depending on the functionalities provided by the electronic device, a user may listen to music, play games or video, record video or take pictures, place and receive telephone calls, communicate with others, control other devices (e.g., via remote control and/or Bluetooth functionality), and so forth while moving freely with the device. In addition, device may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems that are configured to render graphical data, such as a desktop computer.

In the presently illustrated embodiment, the exemplary device includes an enclosure or housing, a display, user input structures, and input/output connectors. The enclosure may be formed from plastic, metal, composite materials, or other suitable materials, or any combination thereof. The enclosure may protect the interior components of the electronic device from physical damage, and may also shield the interior components from electromagnetic interference (EMI).

The display may be a liquid crystal display (LCD), a light emitting diode (LED) based display, an organic light emitting diode (OLED) based display, or some other suitable display. In accordance with certain embodiments of the present invention, the display may display a user interface and various other images, such as logos, avatars, photos, album art, and the like. Additionally, in one embodiment, the display may include a touch screen through which a user may interact with the user interface. The display may also include various function and/or system indicators to provide feedback to a user, such as power status, call status, memory status, or the like. These indicators may be incorporated into the user interface displayed on the display.

In an embodiment, one or more of the user input structures are configured to control the device, such as by controlling a mode of operation, an output level, an output type, etc. For instance, the user input structures may include a button to turn the device on or off. Further the user input structures may allow a user to interact with the user interface on the display. Embodiments of the portable electronic device may include any number of user input structures, including buttons, switches, a control pad, a scroll wheel, or any other suitable input structures. The user input structures may work with the user interface displayed on the device to control functions of the device and/or any interfaces or devices connected to or used by the device. For example, the user input structures may allow a user to navigate a displayed user interface or to return such a displayed user interface to a default or home screen.

The exemplary device may also include various input and output ports to allow connection of additional devices. For example, a port may be a headphone jack that provides for the connection of headphones. Additionally, a port may have both input/output capabilities to provide for connection of a headset (e.g., a headphone and microphone combination). Embodiments of the present invention may include any number of input and/or output ports, such as headphone and headset jacks, universal serial bus (USB) ports, IEEE-1394 ports, and AC and/or DC power connectors. Further, the device may use the input and output ports to connect to and send or receive data with any other device, such as other portable electronic devices, personal computers, printers, or the like. For example, in one embodiment, the device may connect to a personal computer via an IEEE-1394 connection to send and receive data files, such as media files. Further details of the device can be found in U.S. Pat. No. 8,294,730, assigned to Apple, Inc.

In embodiments of the present invention, various uses of blockchain coding may provide authentication and verification of the education process. For example, course materials provided directly from an institution (e.g. lecturer, professor) or the modified course materials provided to the user using embodiments of the present invention may be encoded into a first block (not necessarily the ordinal first block) in a block chain. In various embodiments, the authentication may also include proof of accreditation of the course and/or the institution itself. In some embodiments, prior to hashing, the materials may be encoded with a provider private key. In some embodiments, prior to hashing, the materials may be authenticated by an accrediting body with a private key. It is contemplated that the first block can help verify the materials provide to the user are genuine and authorized.

In some embodiments, education materials provided to the user are customized for each user, for example, by adding the user's name, address, student identifier, or the like to the documents, videos, etc. Accordingly, the blockchain hash of educational materials for different users should also be different. Such techniques are usable in embodiments where course materials are highly valuable, and only students who enroll in the course should be able to receive credit or certification for the course. In such cases, if a third-party attempts use the course materials without registering, the third party cannot receive accreditation for the course. This is because the block corresponding to the course materials in the third party's blockchain will not be authenticated with the third party's name.

Next, in various embodiments, if a user completes a course successfully, an additional block is added to the blockchain. The blockchain hash may be performed upon the student data (e.g. name, student ID, course, time, etc.), one or more certificates of completion, course information (e.g. institution name, professor name, course name, credit hours, etc.), grade, and the like. In various embodiments, the user may be authenticated by other means, such as social security number, private key, password, or the like. In various embodiments, the new block includes a hash of the previous block (e.g. proof that the education materials used were authorized) plus the hash of the above user information. As a result, the blockchain can be used to prove that the authorized user completed a specific course authorized by a specific accredited institution.

In various embodiments of the present invention, as a user repeats the above process for different courses, additional blocks are added to the blockchain. The blockchain thus can verify the user's credits, grades, etc.; can verify that the course was provided by an authorized institution, and can verify that the user was authorized to take the course. In various embodiments, various educational providers, educational institutions, and other distributed stakeholders by store blockchains geared towards educational achievements.

In some embodiments, transactions within the process described above may also include payment information. In various embodiments, payment information may be made using available coin offerings. In other embodiments, payment information may be made using a custom coin offering directed to education on all different levels, education from institutions of higher learning, offerings in conjunction with educational 529 plans, and the like. The inventor is not currently aware of such educationally-directed coin offerings, but believes they may be used in various embodiments of the present invention.

In an example, the invention also includes a method for a secure learning experience using an encrypted encoded network. The method includes configuring a course module information derived from an interactive course platform coupled to a server and a network. In an example, the course module comprises information provided from a human user coupled to a plurality of sensing devices, including at least an image capturing device, a motion sensor, and an ambient sensor. The method includes assigning a time and date stamp on the course module and processing the course module to validate it against a predetermined quality metric, coding format, and ratification information to configure a second course module in a canonical format. The method includes processing the course module in the second format using an encryption process and configuring the course module on a public ledger in a block chain configuration.

In various embodiments of the present invention, using one or more of the above-described sensors, associated with the user's client system (e.g. smart phone, laptop, etc.) the user's actions may be monitored. More specifically, while the user is interacting with course materials, e.g. video or audio lectures, interactive presentations, or the like, actions of the user may be captured. Types of user actions may include, the user's use of a keyboard or mouse; the user moving or tilting the user's client system; the movement of the user's head, eyes, hands; whether the user's eyes are open; whether the user is talking or listening to a different audio source; and the like. In various embodiments, the user's interactions may be stored on the client system and/or uploaded to a remote (educational) server.

In various embodiments various methods may be used to determine whether the user actions indicate the user is paying attention to the lecture or presentation or not. As an example, in one embodiment, the video camera on the (user's) client system may monitor whether the user's head is facing the client system display, whether the user's eyes are directed toward the screen, and the like. Next, based upon an analysis of the video image, it can be determined whether the user is paying attention or not. In one example, the amount of time the user's eyes face the screen per time period (e.g. per minute) is computed, and compared to other time periods. In one embodiment if there is a negative slope over multiple time periods (e.g. two, three or more), the remote server may conclude that the user is not paying attention. In one example, the amount of time the user's eyes faces the display per minute is as follows: 1 minute, 45 seconds; 2 min, 50 sec; 3 min, 40 sec; 4 min, 40 sec; 5 min, 30 sec; 6 min 20 sec; etc. Based upon this example, because there is a pronounced negative slope over several time periods, the remote server may determine that by the sixth minute, the user is not paying attention to the lecture. In other embodiments, other types of metrics, and other periods of time may be utilized. For example, the user may be asked to answer questions within a certain amount of time; to strike a key on a keyboard; to say a word; or the like. In various embodiments of the present invention, the metrics used to make the above determinations may be termed a user efficiency factor or a learning utilization factor.

In various embodiments, based upon the user efficiency factor, the client system and/or the remote system may provide immediate feedback to the user, or feedback at a later time. In some embodiments, the feedback may be positive feedback to the user, praising the user for their efforts and/or further encouraging the user. Examples of positive feedback may include giving the user rewards for paying attention to a lecture, or the like, such as points the user may spend on in-application purchases (e.g. stickers, outfits, decorations, additional courses or lectures, etc.); points the user may apply to real-world items (e.g. coffee cards, Amazon gift cards, etc.); crypto currency (e.g. Bitcoin, Ethereum, etc.); and the like.

In some embodiments of the present invention, the user rewards may include assigning the user one or more block chain (e.g. crypto currency) processes. In such a case, the remote server may include one or more dedicated hardware crypto currency mining rigs, and/or block chain mining software. When a reward is earned by a user, the remote server may instantiate a copy of the block chain mining software and assign the process to the user. It is contemplated that multiple users of the remote server may have one or more mining processes associated therewith. In some cases, each user may mine independently; in other cases all uses of the educational server(s) may form a mining pool; and in still other cases, groups of users may form smaller mining pools, e.g. groups of students taking a specific course; or the like. In some embodiments, the block-chain mining may be associated with a general purpose cryptocurrency (e.g. Bitcoin), and in other embodiments, the mining may be associated with an educational cryptocurrency, and the like.

In some embodiments of the present invention, the user efficiency factor may lead to an inference that the user is not actively paying attention and/or that the user is not actively learning. Accordingly, different ways of attempting to get the user's attention may be performed. In some cases, the actions may be performed by the user's client system with or without receiving further instructions from the remote server. Examples of actions that may be performed include: modifying (e.g. increasing) the volume of audio; modifying the presentation (e.g. increasing brightness or contrast, providing bright flashes); playing audio output (e.g. spoken words, music, a beep sound, sound effects); modifying or overlaying graphics associated with the presentation (e.g. changing a background to orange, overlaying an icon of a flying bird over the presentation, and the like); pausing the lecture or presentation; presenting one or more questions about the lecture; and the like.

In some embodiments, other types of actions may be performed when the user learning utilization indicates inattention, such as reducing computer and network resource allocation and usage. Examples of reducing resource usage includes reducing the frame rate or resolution of a video presentation, reducing audio and/or video bit rate, decreasing a quality of service level, increasing a client response latency (e.g. decreasing a user priority level), reducing a communication data rate or bandwidth, changing a communication channel (e.g. from 4G to 3G or Edge), and the like. In light of the present patent disclosure, one of ordinary skill in the art will consider other alternatives that are still within embodiments of the present invention.

In various embodiments of the present invention, it is contemplated that over time, user actions from multiple users will be captured for each lecture or presentation. Such data may be used to dynamically allocate computer and network resources intra-lecture (e.g. during the lecture). For example, if multiple users have a user action drop off during a specific portion of a lecture or presentation, embodiments may reduce the computer and/or network resources used during the specific portion for other users. Embodiments may also be used inter-lecture (e.g. for different lectures) such that different levels of resources are utilized or provided according to previous users' actions. As an example, a first lecture may be output using 1× computer and network resources, whereas a second lecture may be output using 0.8× computer and network resources. As can be seen, the user action may be used to adjust, e.g. reduce server requirements (e.g. amount of memory, number of processor cores, number of virtual servers, and the like.) In various embodiments, if physical servers are owned and used, the number of servers, e.g. footprint may be reduced; and if the servers are subscribed from the cloud (e.g. AWS), the level of cloud service may be reduced. In various embodiments, the computer and network resources described in the paragraph above may be adjusted as described in this paragraph.

In various embodiments, the user efficiency factor for a lecture or presentation may be correlated with user performance for the lecture. It is contemplated that numerous questions will be provided to the user during a lecture, and the user answers them to complete the lecture. In some embodiments, the user performance may include an efficiency factor that indicates how many times the user submits answers to questions, before they answer all the question correctly; in some embodiments, the user performance may include a persistence factor that indicates the number of times the user watches a lecture, until they answer all of the questions correctly; and the like. In some embodiments, based upon the efficiency factor, persistence factor, and the like the user for a lecture, user feedback may also be provided. For example, users may be given a reward for having a high efficiency factor, users may be given a reward for having a high persistence factor, and the like. Such embodiments thus reward the user, not based upon one metric, but multiple (potentially orthogonal) metric. In various embodiments, the rewards discussed herein, e.g. points, coins, mining processes, and the like, may be provided as feedback.

In some embodiments, the user performance may also be used by the remote server to provide feedback to the user. As an example, a user watches the first two lectures for a class at 9 pm and has a user performance of 90%; the user watches the next lecture for the class at midnight and has a user performance of 80%, and the user watches the next three lectures for the class at 3 am and has a user performance of 70%. In such a case, the user may be encouraged by embodiments to watch lectures earlier at night, e.g. 9 pm, rather than late at night e.g. 3 am, as the user's performance has shown to suffer the later they watch the lecture. Such feedback may be given intra-lecture (as described above); may be given inter-lecture (e.g. for different lectures for a particular class); and may also be given inter-course (e.g. user feedback for one course given to the user when beginning a different course).

In some cases, the user feedback described above may be provided on one or more dashboards provided to the user. As an example, the user may see a graph of their eyes facing the screen during a lecture; the user may see a graph of their user efficiency points and their persistence points for different lectures (e.g. net learner improvement); the user may see their net user efficiency for different classes (e.g. net learner improvement); and the like. In other embodiments, other types of data associated with the user for different lectures and or different classes may also be provided to the user.

Having described various embodiments, examples, and implementations, it should be apparent to those skilled in the relevant art that the foregoing is illustrative only and not limiting, having been presented by way of example only. Many other schemes for distributing functions among the various functional elements of the illustrated embodiment or example are possible. The functions of any element may be carried out in various ways in alternative embodiments or examples.

Also, the functions of several elements may, in alternative embodiments or examples, be carried out by fewer, or a single, element. Similarly, in some embodiments, any functional element may perform fewer, or different, operations than those described with respect to the illustrated embodiment or example. Also, functional elements shown as distinct for purposes of illustration may be incorporated within other functional elements in a particular implementation. Also, the sequencing of functions or portions of functions generally may be altered. Certain functional elements, files, data structures, and so one may be described in the illustrated embodiments as located in system memory of a particular or hub. In other embodiments, however, they may be located on, or distributed across, systems or other platforms that are co-located and/or remote from each other. For example, any one or more of data files or data structures described as co-located on and "local" to a server or other computer may be located in a computer system or systems remote from the server. In addition, it will be understood by those skilled in the relevant art that control and data flows between and among functional elements and various data structures may vary in many ways from the control and data flows described above or in documents incorporated by reference herein. More particularly, intermediary functional elements may direct control or data flows, and the functions of various elements may be combined, divided, or otherwise rearranged to allow parallel processing or for other reasons. Also, intermediate data structures of files may be used and various described data structures of files may be combined or otherwise arranged.

In other examples, combinations or sub-combinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A computing apparatus, the apparatus comprising:
 a bus device configured to be an interface for transmission of data;
 a processor;
 a plurality of sensing devices coupled to the bus device, the plurality of sensing devices including an image capturing device; and
 a memory resource coupled to the bus device;
 a course module application stored on the memory resource;
 a network interface coupled to the bus device,
 whereupon when executed by the processor, the course module application causes the apparatus to:
  output a course directed to a subject, the course comprising a plurality of templates and a video associated with a subject;
  execute an artificial intelligence (AI) module comprising a plurality of nodes by performing a neural network process, each of the nodes being coupled to one or more of the plurality of sensing devices;
  perform a first feedback process to infer, by the AI module using information from the one or more of the plurality of sensing devices, whether a user is actively paying attention to the course, and to provide feedback to the user based on the inference, the feedback including a time for watching a lecture for the course;
  determine, based on the inference of whether the user is actively paying attention to the course, whether the user has earned a reward;
  in response to determining that the user has earned the reward, and cause a reward to be generated and provide the generated reward to the user;
  determine, based on the inference of whether the user is actively paying attention to the course, whether the user is not actively paying attention to the course;
  in response to determining that the user is not actively paying attention to the course, performing an action configured to get the attention of the user; and
  execute a natural language processing to process information to identify a characteristic of the user in association with the course.

2. The apparatus of claim 1 wherein the first feedback process comprises a plurality of characteristics to allow the user to achieve a predetermined score within a range for the course.

3. The apparatus of claim 1 wherein the reward comprises a digital currency.

4. The apparatus of claim 3, wherein the digital currency is a crypto currency.

5. The apparatus of claim 1 wherein the plurality of nodes comprises at least 1 million nodes; and wherein the plurality of sensing devices comprises a camera, a keyboard, an accelerometer sensor, an rf sensor, a gyroscope, a chemical sensor, a temperature sensor, a microphone, or combinations thereof.

6. The apparatus of claim 1 further comprising a wearable device comprising a set of sensors to characterize movement, orientation, temperature, heart rate, breathing rate, oxygen, and other parameters of the user while interacting with the course, the wearable device being coupled to an input of the artificial intelligence module.

7. The apparatus of claim 1 wherein the artificial intelligence module comprises a neural network module configured to receive information from the image capturing device and output a learning characteristic of the user.

8. The apparatus of claim 1 wherein the artificial intelligence module comprises a neural network module configured to receive information associated with a facial expression and an eye response from the image capturing device and output a learning characteristic of the user.

9. A method of using a computing apparatus comprising:
in the computing apparatus comprising a bus device configured to be an interface for transmission of data; a processor; a plurality of sensing devices coupled to the bus device, the plurality of sensing devices including an image capturing device; a memory resource coupled to the bus device and including a course module application; a time and location device configured to transfer spatial location information and time information; and a network interface coupled to the bus device,
executing the course module application by the processor causes the apparatus to:
output a course directed to a subject, the course comprising a plurality of templates and a video associated with a subject;
execute the artificial intelligence (AI) module comprising a plurality of nodes by performing a neural network process, each of the nodes being coupled to one or more of the plurality of sensing devices;
perform a first feedback process to infer, by the AI module using information from the one or more of the plurality of sensing devices, whether a user is actively paying attention to the course, and to provide feedback to the user based on the inference, the feedback including a time for watching a lecture for the course;
determine, based on the inference of whether the user is actively paying attention to the course, whether the user has earned a reward;
in response to determining that the user has earned the reward, cause digital currency to be generated and provide the generated digital currency to the user as the reward;
determine, based on the inference of whether the user is actively paying attention to the course, whether the user is not actively paying attention to the course; and
in response to determining that the user is not actively paying attention to the course, performing an action configured to get the attention of the user.

10. The method of claim 9 wherein the processor is characterized by a first predetermined power range is associated with a first mode associated with the course, and a second predetermined power range is associated with a second mode associated with the course.

11. The apparatus of claim 9, wherein the course module application when executed by the processor further causes the apparatus to:
perform a second feedback process configured to intake information output by the AI module and to reduce a number of cycles executed by the processor from a first predetermined number range to a second predetermined number range to reduce a power consumption of the processor from a first predetermined power range to a second predetermined power range.

12. The apparatus of claim 9, wherein the feedback to the user includes positive feedback to the user in response to the apparatus inferring that the user is actively paying attention to the course.

13. The apparatus of claim 9, wherein the digital currency is an educationally-directed crypto currency.

14. The apparatus of claim 9, wherein the digital currency is generated using dedicated crypto currency mining hardware included in a remote server.

15. The apparatus of claim 9, wherein the digital currency is generated in the apparatus.

16. A method of using a computing apparatus, the method comprising:
in the apparatus including a bus device configured to be an interface for transmission of data; a processor; a plurality of sensing devices coupled to the bus device, the plurality of sensing devices including an image capturing device; a memory resource coupled to the bus device and including a course module application; and a network interface coupled to the bus device,
executing the course module application by the processor to:
output a course directed to a subject, the course comprising a video associated with the subject;
execute an artificial intelligence (AI) module comprising a plurality of nodes by performing a neural network process, each of the nodes being coupled to one or more of the plurality of sensing devices;
perform a first feedback process to infer, by the AI module using information from the one or more of the plurality of sensing devices, whether a user is actively paying attention to the course, and to provide feedback to the user based on the inference, the feedback including a time for watching a lecture for the course;
determine, based on the inference of whether the user is actively paying attention to the course, whether the user has earned a reward;
in response to determining that the user has earned the reward, cause a reward to be generated;
determine, based on the inference of whether the user is actively paying attention to the course, whether the user is not actively paying attention to the course; and
in response to determining that the user is not actively paying attention to the course, performing an action configured to get the attention of the user,
wherein the network interface is coupled to a network, and wherein the course module application when executed by the processor further causes the apparatus to:
in response to inferring that the user is not actively paying attention to the course, cause an allocation, a usage, or both of a network resource of the network to be reduced.

17. The method of claim 16 wherein the reward comprises a digital currency.

18. The method of claim 16 wherein the reward comprises a digital currency and the digital currency comprises a crypto currency.

19. The method of claim 16 wherein the reward is related to education.

* * * * *